United States Patent
Mysore et al.

(10) Patent No.: US 12,266,077 B2
(45) Date of Patent: Apr. 1, 2025

(54) DEEP LEARNING OF ENTITY RESOLUTION RULES

(71) Applicant: International Business Machines Corporation, Armonk, NY (US)

(72) Inventors: Sheshera Mysore, Sunderland, MA (US); Sairam Gurajada, San Jose, CA (US); Lucian Popa, San Jose, CA (US); Kun Qian, San Jose, CA (US); Prithviraj Sen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 17/120,974

(22) Filed: Dec. 14, 2020

(65) Prior Publication Data

US 2022/0188974 A1    Jun. 16, 2022

(51) Int. Cl.
*G06N 20/00*    (2019.01)
*G06N 3/08*    (2023.01)
*G06N 5/025*    (2023.01)
*G06T 3/4046*    (2024.01)
*G06F 16/215*    (2019.01)
(Continued)

(52) U.S. Cl.
CPC .............. *G06T 3/4046* (2013.01); *G06N 3/08* (2013.01); *G06N 5/025* (2013.01); *G06F 16/215* (2019.01); *G06F 40/295* (2020.01); *G06N 3/042* (2023.01); *G06N 3/044* (2023.01); *G06N 3/045* (2023.01)

(58) Field of Classification Search
None
See application file for complete search history.

(56) References Cited

U.S. PATENT DOCUMENTS

| | | | |
|---|---|---|---|
| 9,922,290 B2 | 3/2018 | Thomas et al. | |
| 2009/0006282 A1* | 1/2009 | Roth | G06F 16/215 706/47 |

(Continued)

FOREIGN PATENT DOCUMENTS

CN    106202044 A    12/2016

OTHER PUBLICATIONS

Mayank, Mohit. "String Similarity-the Basic Know Your Algorithms Guide!" Medium, ITNEXT, Jan. 8, 2020, itnext.io/string-similarity-the-basic-know-your-algorithms-guide-3de3d7346227.*

(Continued)

*Primary Examiner* — David R Vincent
(74) *Attorney, Agent, or Firm* — Joseph P. Curcuru

(57) ABSTRACT

A method, system, and computer program product for learning entity resolution rules for determining whether entities are matching. The method may include receiving historical pairs of entities. The method may also include determining a set of rules for determining whether a pair of entities are matching, where the set of rules comprises a plurality of conditions. The method may also include developing, using a deep neural network, an entity resolution model based on the historical pairs of entities. The method may also include receiving a new pair of entities. The method may also include applying the entity resolution model to the new pair of entities. The method may also include determining whether one or more rules from the set of rules are satisfied for the new pair of entities. The method may also include categorizing the new pair of entities as matching or not matching.

18 Claims, 7 Drawing Sheets

(51) Int. Cl.
G06F 40/295 (2020.01)
G06N 3/042 (2023.01)
G06N 3/044 (2023.01)
G06N 3/045 (2023.01)

(56) References Cited

U.S. PATENT DOCUMENTS

| | | | | |
|---|---|---|---|---|
| 2013/0297661 | A1* | 11/2013 | Jagota | G06F 16/11 707/822 |
| 2019/0303371 | A1* | 10/2019 | Rowe | G06F 16/24564 |
| 2019/0311229 | A1* | 10/2019 | Qian | G06F 18/41 |
| 2020/0210466 | A1* | 7/2020 | Yin | G06F 16/313 |
| 2021/0064705 | A1* | 3/2021 | Lu | G06F 40/56 |
| 2022/0067585 | A1* | 3/2022 | Balaraman | G06V 10/40 |
| 2022/0067857 | A1* | 3/2022 | Hiltch | G06Q 30/0201 |
| 2022/0092405 | A1* | 3/2022 | Frank | G06N 3/047 |

OTHER PUBLICATIONS

Chen et al., "Towards Interpretable and Learnable Risk Analysis for Entity Resolution," SIGMOD, 2020, 16 pages.
Qian et al., "SystemER: a Human-in-the-loop System for Explainable Entity Resolution," Proceedings of the VLDB Endowment, vol. 12, No. 12, pp. 1794-1797.
Singh et al., "Generating Concise Entity Matching Rules," SIGMOD, Proceedings of the 2017 ACM International Conference on Management of Data, 2017, pp. 1635-1638.
Petrova et al., "Towards explainable entity matching via comparison queries," CEUR-WS.org, vol. 1-2536\om2019_poster5.pdf, 2019, 2 pages.
Eberle et al., "Building and Interpreting Deep Similarity Models," imarXiv: 2003.05431v1 [cs.LG], Mar. 11, 2020, 16 pages.
"Strsim 0.0.3," pip install strsim, Released Jul. 13, 2018, 16 pages, https://pypi.org/project/strsim/.
"SimMetrics," GitHub Inc., Simmetrics, 2020, https://github.com/Simmetrics/simmetrics.
Mudgal et al., "Deep Learning for Entity Matching: A Design Space Exploration," SIGMOD 2018, Jun. 10-15, 2018, Houston, TX, USA, 16 pages.
Arya et al., "One Explanation Does Not Fit All; A Toolkit and Taxonomy of AI Explainability Techniques," arXiv:1909.03012v2 [cs.AI], Sep. 14, 2019, 18 pages.
"Introduction to the high-level integration language," IBM, IBM Knowledge Center, Last Updated May 27, 2020, 5 pages, https://www.ibm.com/support/knowledgecenter/SSWSR9_11.4.0/com.ibm.swg.im.mdmhs.pmebi.doc/topics/HIL_intro.html.
Hernandez et al., "HIL: A High-Level Scripting Language for Entity Integration," EDBT 2013, 12 pages.
Zhu et al., "To Prune, or Not to Prune: Exploring the Efficacy of Pruning for Model Compression," Workshop track—ICLR 2018, 10 pages.
Louizos et al., "Learning Sparse Neural Networks Through L0 Regularization," Published as a conference paper at ICLR 2018, 13 pages.
Kasai et al., "Low-resource Deep Entity Resolution with Transfer and Active Learning," ACL, Proceedings of the 57th Annual Meeting of the Association for Computational Linguistics, 2019, pp. 5851-5861.
Thirumuruganathan et al., "Explaining Entity Resolution Predictions : Where are we and What needs to be done?" HILDA 2019, 6 pages.
Ebaid et al., "Explainer: Entity Resolution Explanations," ICDE 2019, 4 pages.
Ribeiro et al., "Why Should I Trust You?" Explaining the Predictions of any Classifier, KDD 2016, ACM, 10 pages.
Arasu et al., "On Active Learning of Record Matching Packages," SIGMOD 2010, 12 pages.
Qian et al., Active Learning for Large-Scale Entity Resolution, CIKM 2017, Proceedings of the 2017 ACM on Conference on Information and Knowledge Management, 2017, pp. 1379-1388.
Singla et al., "Entity Resolution with Markov Logic," ICDM 2006, 11 pages.
Sen et al., "Producing Explainable Rules via Deep Learning," U.S. Appl. No. 16/780,721, filed Feb. 3, 2020.

* cited by examiner

Rule 1: r1.lastname = r2.lastname and r1.exactfn = r2.exactfn and middleNameOptionalMatch (r1.middlename, r2.middlename) and jaccardSimilarity (r1.location, r2.location, 70) and allFullFirstName (r1.isfnInit, r2.isfnInit)

Rule 2: NameFrequencyFilter (r1.lastname, 40.0) and isinUS (r1.isinUS) and r1.organization = r2.organization and r1.lastname = r2.lastname and r1.exactfnInit = r2.exactfnInit and atleastOneInitial (r1.isfnInit, r2.isfnInit)

Rule 3: ...

FIG. 5

DEEP LEARNING OF ENTITY RESOLUTION RULES

BACKGROUND

The present disclosure relates to entity resolution and, more specifically, to using deep neural networks to learn entity resolution rules for determining whether entities are matching.

Entity resolution is the process of grouping or matching multiple entities of the same object and disambiguating the entities. For instance, there may be multiple records or accounts for the same person, the same business, etc. Entity resolution determines whether the multiple records or accounts match (i.e., are for the same object) or do not match (i.e., are for different objects). For example, entity resolution may be used to determine that a record "Best Bank Corp." is the same as, or is matching, a record for "Best Bank Corporation." In another example, entity resolution may be used to determine that a record for John Doe living at 1234 $1^{st}$ St. NW does not match a record for Johnny Doe living at 1234 $1^{st}$ St. SW. Entity resolution has many applications, particularly with datasets and databases. A dataset, for instance, may include multiple entities that correspond to the same object (for example, different email addresses for the same person, different names for the same business address, the same product sold on multiple websites, etc.) and entity resolution may determine whether the different entities actually correspond to the same object and match the entities accordingly.

SUMMARY

The present invention provides a computer-implemented method, system, and computer program product to learn entity resolution rules, using deep neural networks, for determining whether entities are matching. The method may include receiving historical pairs of entities including labels indicating whether the historical pairs of entities match. The method may also include determining a set of rules for determining whether a pair of entities are matching using the historical pairs of entities, where the set of rules comprises a plurality of conditions, each condition representing an instance where the pair of entities could be matching. The method may also include developing, using a deep neural network, an entity resolution model based on the historical pairs of entities, where the entity resolution model comprises the set of rules. The method may also include receiving a new pair of entities. The method may also include applying the entity resolution model to the new pair of entities. The method may also include determining whether one or more rules from the set of rules are satisfied for the new pair of entities. The method may also include categorizing the new pair of entities as matching or not matching, based on whether the one or more rules are satisfied. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts an example entity resolution model, according to some embodiments.

Figure 1:
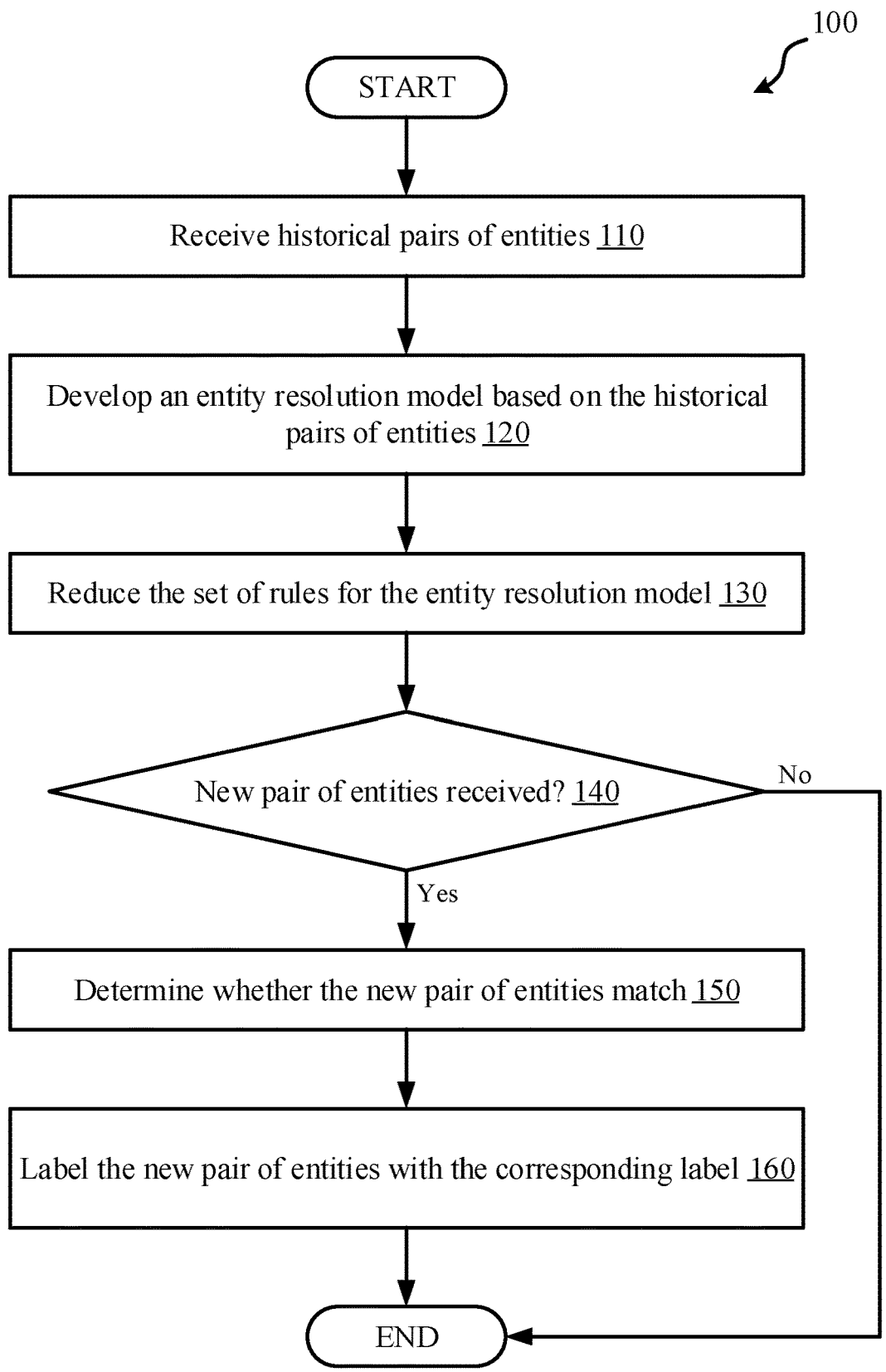
FIG. 1 depicts a flowchart of a set of operations for learning entity resolution rules and performing entity resolution on a pair of entities using the entity resolution rules, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to entity resolution and, more specifically, to using deep neural networks to learn entity resolution rules for determining whether entities are matching. While the present disclosure is not necessarily limited to such applications, various aspects of the disclosure may be appreciated through a discussion of various examples using this context.

As discussed herein, entity resolution helps identify which mentions or entities correspond to the same object (e.g., person, place, thing, etc.). In processes such as data integration, where data is being combined from multiple sources, entity resolution is a big challenge. For instance, it is difficult, using conventional processes, to accurately match records/data and determine whether the records should be linked. Entity resolution typically requires accurate measurement of attribute similarities (for example, to determine whether products are similar, the various attributes, such as the titles of the objects, need to be measured to determine the similarity of the titles), however accurate measurement of attribute similarities may be difficult using conventional methods. For instance, conventional methods may use predefined similarity functions to attempt to measure attribute similarities, but the pre-defined functions may not be accurate and/or may not be sufficient for all domains of the data integration.

Additionally, in some instances, black box classifier models may be used for entity resolution. However, the black box models may not be interpretable nor trustworthy due to the opaqueness of the model. For instance, users may not be able to determine why the black box model is making the determinations it is, whether the black box model is overfit, etc. This may make it difficult for a user to trust and/or rely on the model. Further, this may make it difficult for the system to determine the accuracy of the model, as not much about the calculations and the reasoning behind the conclusions of the black box model may be known.

The present disclosure provides a computer-implemented method, system, and computer program product for learning entity resolution rules, using deep neural networks, and automatically determining whether various entities are matching entities using the entity resolution rules. The entity resolution rules may be used to develop an entity resolution model for performing entity resolution on various entities. The entity resolution model may include sets of rules and conditions for when entities may or may not be matching. In some instances, the entity resolution model may be an explainable model. An explainable model may enable interpretation and verification of the model. Because users may interpret and verify the entity resolution model, users may be more trusting of the model compared to conventional black box models. In some instances, the entity resolution rules may be interpretable, in addition to the entity resolution model itself. This may further the transparency of the entity resolution model which may increase both the user trust in the model as well as the accuracy of the model itself (for example, because the system may be able to more easily check for overfitting, diagnose errors in the model, etc.).

In some instances, a deep neural network is used to form the entity resolution model (for example, using historical pairs of entities that have been matched, or not matched, using conventional methods). For instance, similarity functions (for example, coding functions of conditions for when two entities may be similar) of historical pairs of entities may be inputted into a deep neural network, and the deep neural network may learn predicate parameters, types of conjunctions, etc. for the various similarity functions and then may form the entity resolution rules based on the similarity functions and their corresponding predicate parameters, types of conjunctions, etc. By using the deep neural network to form the various rules and the entity resolution model, the model and the corresponding rules may be more accurate than models formed using conventional methods, due to the accuracy and learnability of a deep neural network. In some instances, the similarity functions, the entity resolution rules, and any other components of the entity resolution model may be communicated in a user comprehendible programming language (as opposed to a black box model that may not be user comprehendible), which may allow for increased explainability, user trust, debugging, etc. for the entity resolution model.

Referring now to FIG. 1, a method 100 for learning entity resolution rules and performing entity resolution on a pair of entities using the entity resolution rules and an entity resolution model is depicted, according to some embodiments. In some embodiments, method 100 is executed by a server (e.g., computer system/server 702 (FIG. 7)) on or connected to a computer system (e.g., computer system 700 (FIG. 7)). In some embodiments, the method 100 is implemented as a computer script or computer program (e.g., computer executable code) to be executed on or connected to the computer system.

Method 100 includes operation 110 to receive historical pairs of entities. In some instances, the historical pairs of entities include labels indicating whether the historical pairs of entities match (for example, match/non-match labels for the various pairs of entities). Historical pairs of entities may be entities that have already undergone entity resolution (for example, using conventional methods) and it has been determined whether the entities are a match or non-match. In some embodiments, a system needs to receive permission to access any historical pairs of entities. For example, a system may be undergoing data integration, integrating data from various sources (e.g., databases, datasets, servers, etc.). In this example, the system may receive permission to access various entity resolution data from the various sources, and the system may receive various historical pairs of entities from the various sources.

Figure 2:
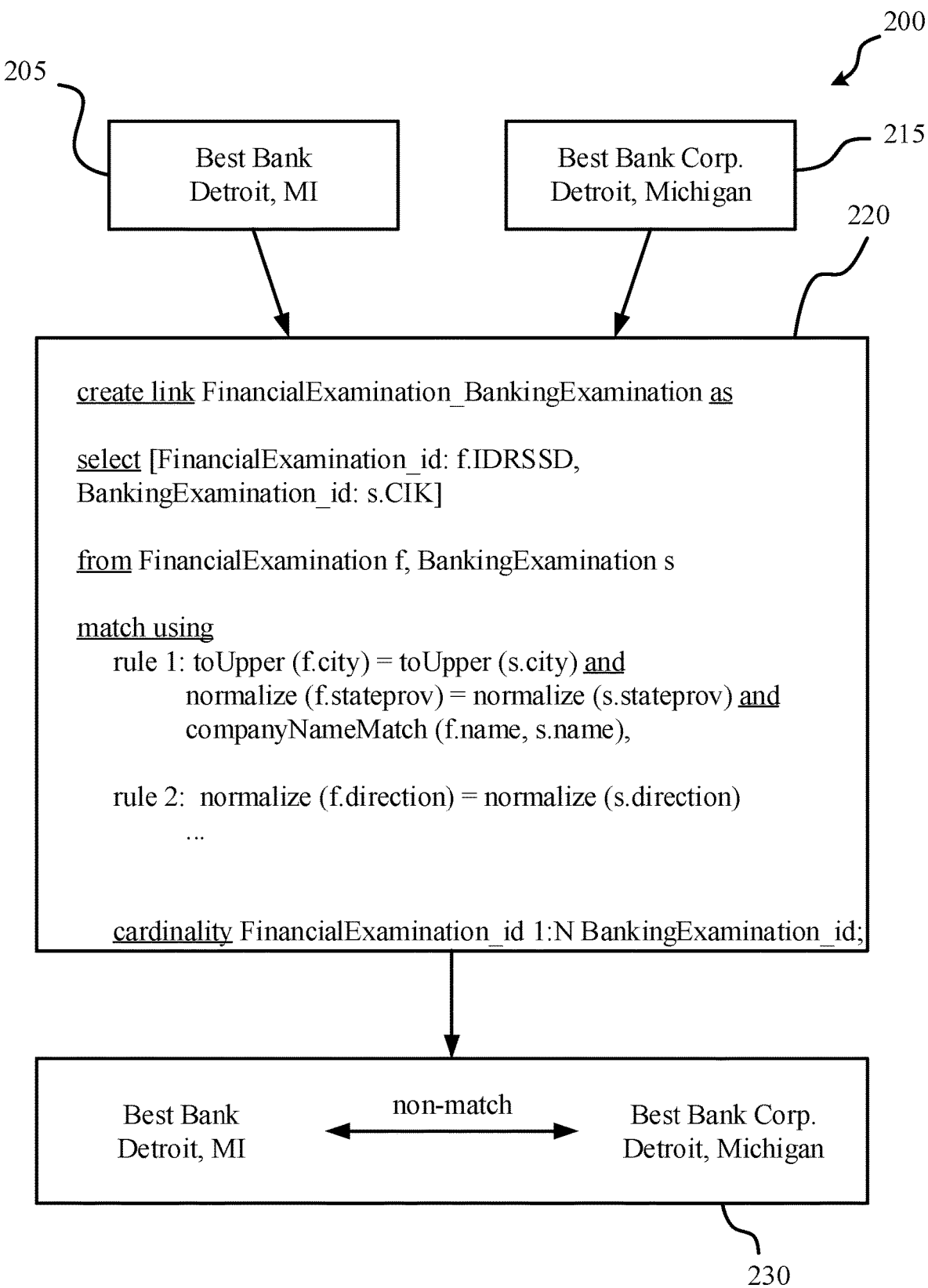
FIG. 2 depicts a schematic diagram of an example entity resolution execution, according to some embodiments.

Method 100 includes operation 120 to develop an entity resolution model based on the historical pairs of entities. An entity resolution model may be a model or description for when entities should be deemed matching and when they should not. In some instances, the entity resolution model includes various rules and conditions for when entities can be considered matching. For instance, the entity resolution model may include conditions that explain when entities are matching, while one or more conditions may constitute a rule. For example, an entity resolution rule relating to location may include a condition that the entities are matching if the city for one entity is equal to the city for the second entity. In this example, there may be a second condition that entities are matching if the house number for one entity is equal to the house number for the second entity. Both conditions, in this example, may be included in a single entity resolution rule regarding the location, or address, of the entities. An example entity resolution model is depicted in FIG. 2.

In some embodiments, the entity resolution model is developed using similarity metrics of the historical pairs of entities (received in operation 110) and a deep neural network. Similarity metrics may be various metrics that should, or could, be used to determine whether entities are similar. For example, if an entity is a merchandise product, similarity metrics could include the name of the product, the Stock Keeping Unit (SKU) number for the product, the selling location of the product, the manufacturing location of the product, etc. In another example, if an entity is a person, similarity metrics could include the first/middle/last name of the person, the address of the person (for example, including the street, city, state, and zip), etc. The similarity metrics may be used to determine whether two entities are similar. Then, in some embodiments (discussed further herein), if the two entities are similar, rules and/or conditions from the entity resolution model are used to determine whether the two entities are matching. The entity resolution model, in some instances, includes rules indicating when the various similarity metrics should be considered matching (for instance, how similar the similarity metrics of the corresponding entities should be to be considered a match when performing entity resolution). The rules may help distinguish between entities that are similar but not matching and entities that are so similar that they are considered matching. For example, Joe Smith I and Joe Smith II may live at the same address, so they may be considered similar entities. However, Joe Smith I and Joe Smith II may be determined to be father and son, so they may not be matching entities as they are not the same person. In another example, there may be two entities, "Joe Smith" and "Joe Smith I." In this example, there may not be a Joe Smith II living at the same address, so Joe Smith and Joe Smith I may be considered matching entities, as they may refer to the same person. Matching entities may be merged together or combined as a single entity through entity resolution. Therefore, using the example above, there may have been two separate records for Joe Smith and Joe Smith I, and these records may be merged together as a single record after it is determined that Joe Smith and Joe Smith I are matching entities. Developing the entity resolution model is further discussed herein and depicted in FIGS. 3-5.

Method 100 includes operation 130 to reduce the set of rules for the entity resolution model. Reducing the set of rules can, in some instances, increase the user-comprehension of the of the model without significantly impacting the accuracy of the model. In some embodiments, for example, the entity resolution model may include all (or at least a significant number of) rules learned from the historical set of entities and any other entities. This may result in an entity resolution model with a substantial amount of rules, which may decrease the ability for users to interpret and understand the rules within the entity resolution model. Further, in some instances, not every rule will have much effect on performing entity resolution. For instance, some rules may largely overlap each other, and it may not be necessary to have all of the rules included in the entity resolution model. Therefore, in some embodiments, sparsification techniques may be applied to the entity resolution model in order to reduce the number or rules within the model without compromising on the accuracy of the model. This way, the model maintains its accuracy but increases its interpretability for its users. Reducing the set of rules for the entity resolution model and model sparsification is further discussed herein in regards to FIG. 2.

Method 100 includes operation 140 to determine whether a new pair of entities for entity resolution has been received. In some embodiments, the new pair of entities may include any entities that may be received by the computer system. In some embodiments, only entities that pass a first threshold indicating that they are received for the purpose of entity resolution may be considered the new pair of entities. For instance, once the entity resolution model has been formed and sparsified, the entity resolution model may be used to perform entity resolution operations on a new pair of entities. Once it is clear that the new pair of entities will undergo entity resolution operations, the new pair of entities may be considered the received new pair of entities.

For example, there may be a first entity of a video game console being sold for $139.99 and a second entity of a video game console with the same name being sold for $159.99. A system (e.g., when undergoing data integration) may need to know whether the two entities are matching (for example, whether the two entities are for the same video game console). Before the entities undergo entity resolution to determine whether they are matching, the entities are received by the system. For instance, when performing data integration, the system may extract the various data from its corresponding source (e.g., database, server, etc.). The system may receive the various entities from the extraction.

In some instances, once the system receives the various data, or entities, the entities may be analyzed to determine whether there are any entities that could be matching. For example, if one entity is an email address for a user and another entity is a name of a business, then the entities may not be candidates for entity resolution. Therefore, in some embodiments, the system may determine whether there are similarities between the various entities (for example, a similarity value above a threshold similarity value) and may flag the entities with similarities for entity resolution. The entities that may be similar, or have a possibility to match, may be the pairs of entities that proceed to operation 150, in some instances.

If a new pair of entities has not been received, in operation 140, method 100 ends. If the system has not received any entities that should undergo entity resolution, then the entity resolution model that was developed in operation 130 may not be immediately needed, and method 100 may end after the development of the entity resolution model.

If a new pair of entities has been received in operation 140, method 100 proceeds to operation 150 to determine whether the new pair of entities match. As discussed herein, when there are pairs of entities that could potentially be matching, these pairs of entities may need to undergo entity resolution to determine whether they are matching. In some instances, to determine whether the new pair of entities are matching, the new pair of entities may be inputted into the entity resolution model. The entity resolution model may output a similarity value between the two entities, in some instances. The similarity value between the two entities may be compared with a threshold similarity value to determine whether the entities are considered matching. Determining whether the new pair of entities match (i.e., operation 150) is further discussed herein and depicted in FIG. 6.

Method 100 includes operation 160 to label the new pair of entities with the corresponding label. Once entity resolution has been performed on a pair of entities, the entities may be labelled so that both the system and users using the system may identify whether the pair of entities is matching. If it is determined that the new pair of entities are matching entities (for example, they correspond to the same person, place, thing, etc.), then the new pair of entities may be labelled with a "match" label indicating that the entities are matching. If it is determined that the new pair of entities are not matching entities (for example, they do not correspond to the same person, place, thing, etc.), then the new pair of entities may be labelled with a "non-match" label indicating that the labels are not a match. An example "non-match" label is depicted in FIG. 2. If the new pair of entities is determined to not be a match (and is labelled with the corresponding label), then both the system and any users of the system know that the new pair of entities are not matching and to treat them as separate entities.

For example, if the pair of entities was not labelled, then a user (or the system) may wonder whether entity resolution techniques have been performed on the records and may wonder whether records corresponding to the pair of entities should be treated as the same records. If the new pair of entities is determined to be matching (and is labelled with the corresponding label), then, in some instances, the records corresponding to the pair of entities may be merged and/or linked. In some instances, the records may be completely merged into a single record. In some instances, the records may remain separate records, but may be linked so it is clear that they correspond to matching entities. For example, the two listings may be two different listings for the same couch on two different retailer websites. In this instance, the records may remain separate (as they are on different retailer websites), but may be labelled to show that they refer to the same product. This may make it clear for users of the system, and the system itself, that entity resolution has been performed on the two entities and that they are matching entities. In another example, the matching records may be two user accounts for the same user on the same website. In this example, once the accounts are labelled as matching, the accounts may be merged together as a single user account on the website.

Referring to FIG. 2, a schematic diagram of an example entity resolution execution 200 is depicted, according to some embodiments. In entity resolution execution 200, two entities, entity 205 and entity 215 are undergoing entity resolution. In some instances, entity 205 and entity 215 may be the new pair of entities received in operation 140 of FIG. 1. Entity 205 is for a business, Best Bank, in Detroit, Michigan Entity 215 is for a business, Best Bank Corp., in Detroit, Michigan.

Entity resolution model 220 is used to perform entity resolution on entities 205 and 215. In some instances, entity resolution model 220 is the model developed in operation 120 of FIG. 1. In entity resolution execution 200, entity 205 may originate from a financial examination source (for example, a server for a financial examination company) and entity 215 may originate from a banking examination source (for example, a server for a banking examination company). The financial examination source and the banking examination source, in this example, may be undergoing data integration to merge together the data stored on the financial examination server and the banking examination server. In entity resolution execution 200, entity 205 and entity 215 are inputted into the entity resolution model 220. Entity resolution model 220 includes a rule relating to businesses (rule 1).

Once the entities 205 and 215 are inputted into the entity resolution model 220, the entity resolution model 220 may perform entity resolution operations on the entities 205 and 215. The entity resolution model 220 first links the sources of each entity (i.e., the financial examination server and the banking examination server) and then establishes entity 205 from the financial examination server as "f" and entity 215 from the banking examination server as "s." Once the entities are established and variables are set, the rule and its various conditions are applied to the entities. Entity resolution model 220 includes a rule with multiple conditions. The first condition, "toUpper (f.city)=toUpper (s.city)," indicates that the uppercase forms of each city (i.e., the city for entity 205 and entity 215) need to be equal in order for the entities to be matching. This condition is true for entities 205 and 215, therefore the entities meet the first condition.

The entity resolution model 220 includes a second condition for the first rule, "normalize (f.stateprov)=normalize (s.stateprov)," which normalizes the state names (for example, converting all states to their abbreviated form) and indicates that the normalized forms of all the state names should be equal in order for the entities to be matching. For entity resolution execution 200, the normalize command may, for example, convert "MI" from entity 205 to "Michigan," and this condition may be determined to be true for entities 205 and 215, as "Michigan" is equal to "Michigan."

The entity resolution model 220 includes a last condition for the first rule, "companyNameMatch (f.name, s.name)," which indicates that the company name for entity 205 must match the company name for entity 215. Because entity 205 includes the company name "Best Bank" and entity 215 includes the company name "Best Bank Corp.," the entities may not meet this condition. In this example entity resolution execution 200, entity 205 is for a specific branch of Best Bank and entity 215 is for the headquarters of Best Bank Corporation, so the entities are not matching. Because rule 1 of the entity resolution model 220 is not satisfied, entities 205 and 215 are not matching. In some instances, rule 2 may not need to be examined because rule 1 has already been determined to not be satisfied. Additionally, even if rule 2 is examined, rule 2 does not apply to entities 205 and 215 as they do not include a direction in their addresses. The direction included in rule 2 may refer to the direction appended to a street in an address, in some instances. Because entities 205 and 215 do not include an appended direction, this rule may not apply. Therefore, entity resolution model 220 can proceed to outputting this information in output 230, including a "non-match" label indicating that Best Bank located in Detroit, MI is not a match for Best Bank Corp. in Detroit, Michigan.

In some instances, entity resolution model 220 may not have undergone model sparsification (for example, as discussed in operation 130 of FIG. 1). As discussed herein, an entity resolution model may include rules, or conditions, that are unnecessary for the model and can be removed without reducing the accuracy of the model. To reduce, or sparsify, the rules for the entity resolution model, a significance weight may be determined for each rule in the model 220. The significance weight may indicate how significant each rule is in determining whether a pair of entities is matching. In some embodiments, the significance weight is determined by analyzing historical entity resolution that has been determined using the model, and determining which rules were used in each historical entity resolution. Further, in some instances, it may be determined whether each historical entity resolution would have reached the same results without each rule. From this, it may be determined how significant each rule is, or how much of an effect each rule has, on determining whether the pair of entities is matching. The significance weights are not depicted in FIG. 2, however (in an example) using the rules 1 and 2 of entity resolution model 220, rule 1 may be given a significance weight of 0.9 and rule 2 may be given a significance weight of 0.02. Once the significance weights are determined, the rules with low significance weights may be removed from the entity resolution model (e.g., entity resolution model 220). In some embodiments, the rule, or rules, with the lowest significance weights may be removed. In some embodiments, the rule, or rules, that do not have the highest significance weights may be removed. In some embodiments, magnitude pruning and/or Lo regularization may be used as sparsification techniques to determine significance weights for the rules and remove the rules with low significance weights.

Continuing the example of entity resolution model 220, rule 2 may be eliminated due to its low significance weight of 0.02 (not depicted). Rule 2 may have a low significance weight because, with the comparisons of city, state, and company name, discussed in rule 1, a comparison of the direction (for example, northwest, southwest, southeast, northeast, north, south, east, and west) may not have much, if any, impact on whether the entities are matching. It may be an unnecessary extra comparison that uses up bandwidth without increasing the accuracy of entity resolution model 220. Therefore, if/when entity resolution model 220 undergoes model sparsification (not depicted), rule 2 may be removed from entity resolution model 220.

Figure 3:
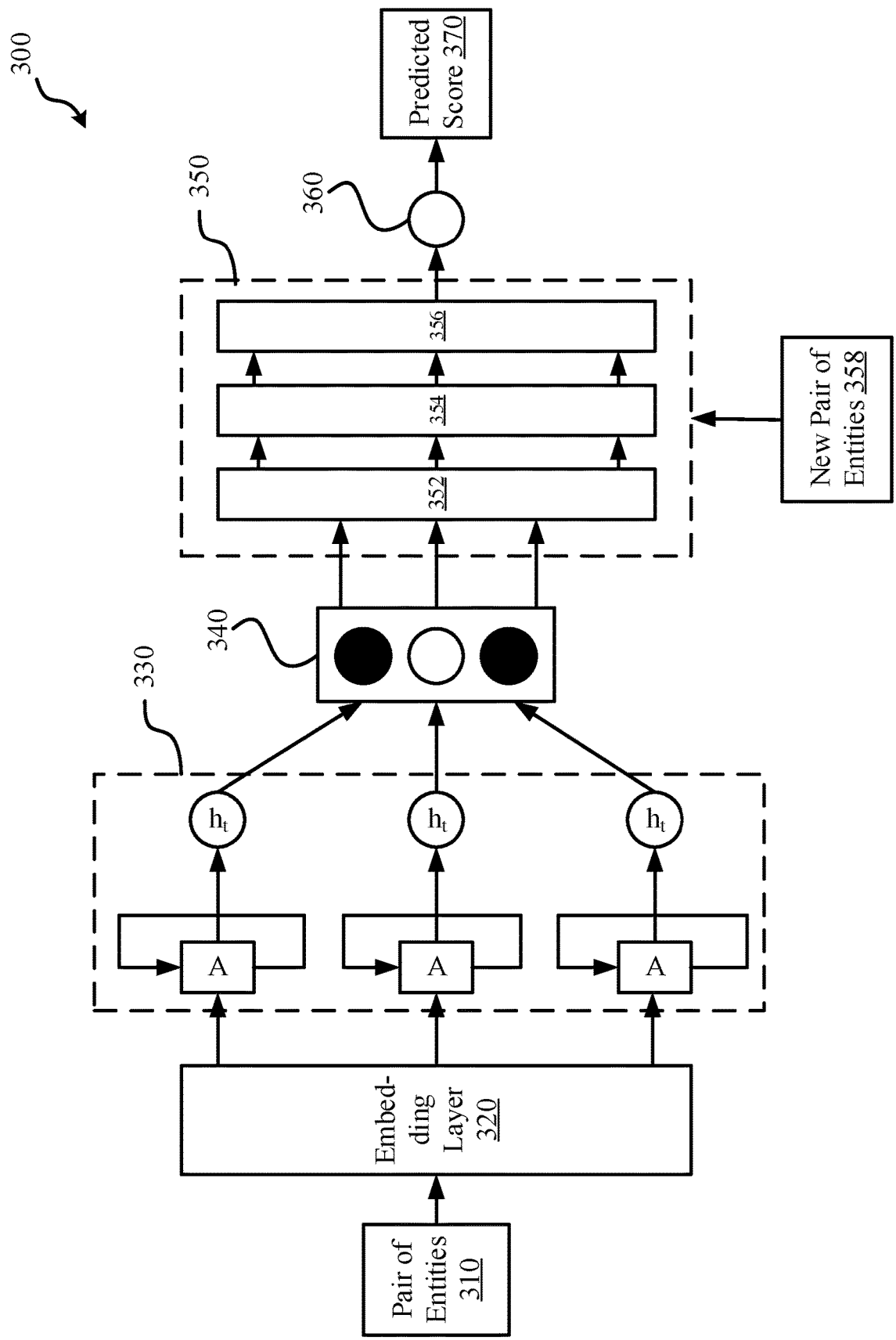
FIG. 3 depicts a schematic diagram of a first example entity resolution model environment, according to some embodiments.

Referring to FIG. 3, a schematic diagram of an example entity resolution model environment 300 is depicted, according to some embodiments. Entity resolution model environment 300 may develop, or create, an entity resolution model in some instances. In entity resolution model environment 300, a pair of entities 310 are inputted into an embedding layer of a deep neural network. In some instances, the pair of entities 310 are a historical pair of entities (such as those received in operation 110). In some embodiments, the pair of entities 310 are inputted into an embedding layer of a deep neural network as part of developing an entity resolution model (for example as depicted in operation 120 of FIG. 1). The embedding layer 320 may perform embedding operations on the text data inputted into the deep neural network. For instance, the embedding layer 320 may learn embeddings for all words from the pair of entities 310.

Once the pair of entities 310 are embedded, they proceed to a recurrent neural network 330. In some instances, recurrent neural network 330 is part of a deep neural network (for example, deep neural network 340). Recurrent neural network 330 is used to determine similarity metrics for the pair of entities 310 in entity resolution model environment 300. For instance, recurrent neural network 330 may analyze the pair of entities 310 (for example in their embedded form) and learn similarity metrics from the analysis. As discussed herein, similarity metrics are various metrics that should, or could, be used to determine whether entities are similar. Put differently, the similarity metrics may be components, or factors, of the entities that should be compared to help determine whether the entities are similar. For example, if an entity is a merchandise product, similarity metrics could include the name of the product, the Stock Keeping Unit (SKU) number for the product, the selling location of the product, the manufacturing location of the product, etc. In another example, if an entity is a person, similarity metrics could include the first/middle/last name of the person, the address of the person (for example, including the street, city, state, and zip), etc. In some embodiments, the recurrent neural network 330 inputs the learned similarity metrics (depicted as the $h_t$ values in the recurrent neural network 330) into a deep neural network 340, discussed further herein. An example learned similarity metric is "r1.lastname=r2.lastname," which, in this example, was learned using historical entity resolution data and the RNN. For instance, in historical entity resolutions (for example, conventional entity resolutions), one way of helping determine whether two entities were the same was to determine whether the last name of each entity was equal. The RNN may learn this using the historical data, and may form the example learned similarity metric "r1.lastname= r.2lastname." This similarity metric indicates that the last names need to be similar, in this instance equal, in order for the entities to be considered similar. In some instances, there may be another similarity metric "jaccardSimilarity (r1.lastname, r2.lastname, $\tau_1$)" indicating that the last names must be above a similarity metric $\tau_1$. In some instances, both of these similarity metrics may become part of a rule, therefore allowing for instances where, for example, a record may misspell a last name. In another example, a learned similarity metric may be "jaccardSimilarity (r1.location, r2.location, $\tau_1$)." In this example, the similarity metric indicates that the locations of the two entities (i.e., r1 and r2) need to be as similar (or more similar) than the similarity metric $\tau_1$. In some instances, the value of the similarity metric is determined when the rules themselves are being created (for example, by deep neural network 340).

Once the similarity metrics are determined using the recurrent neural network 330, the similarity metrics are inputted into the deep neural network 340 in order to determine conditions for each similarity metric. The conditions for the similarity metrics may indicate when the similarity metrics are matching metrics. For example, using the above example similarity metric "jaccardSimilarity (r1.location, r2.location, $\tau_1$)," determining the conditions for the similarity metric (using deep neural network 340) includes establishing a value for $\tau_1$. This value may indicate a threshold similarity value for when metrics are determined to be similar enough to qualify as matching. For instance, the deep neural network 340 may determine a similarity value (ii) of 70, in this example, indicating that the locations need to be 70% similar to meet the threshold similarity. For example, r1.location may be "1234 $1^{st}$ St. NW" and r2.location may be "1234 First Street." These locations may not register as 100% similar, due to the variance of "$1^{st}$" and "First" and the lack of direction in the r2.location, but they may still be over the threshold value of 70% similar.

"jaccardSimilarity (r1.location, r2.location, 70)" is a condition, in this example, as it indicates that when the locations meet the threshold value of 70, the locations can be deemed matching locations. In some instances, there may be conditions that are difficult to distinguish (for example, a first name and a business name). In these instances, the deep neural network may also consider the category of the entities (for instance, whether it is a business record, a personal record, a product type, etc.) and may select the rule and/or condition(s) that applies to the category.

In some instances, determining the various conditions for the similarity metrics, using deep neural network 330 include inputting the similarity metrics into the deep neural network 330 (in entity resolution model 300 there are three similarity metrics inputted into deep neural network 330) and learning (using deep neural network 330) conjunctions and predicate parameters for each similarity metric. Conjunctions, in this instance, are the connections between each similarity metric. For example, in entity resolution model 220 (FIG. 2), the "and" between each condition of rule 1 are the conjunctions. An "and" conjunction indicates that the similarity metrics on each end of the conjunction need to be met in order for the entities to be deemed matching. Therefore, learning conjunctions may include learning which conditions (or combinations of conditions) must be met in order for the rule to be satisfied, and using conjunctions to indicate those conditions. In some embodiments, a predicate is a component of the similarity metric and the similarity metric includes a conjunction of predicates. For example, again using the "jaccardSimilarity (r1.location, r2.location, $\tau_1$)" similarity metric, "r1.location" and "r2.location" are each predicates of the similarity metric. When determining the various conditions for the similarity metrics, predicate parameters may be determined for the various predicates. The predicate parameters may be values, or a range of values, for when the predicates are considered matching. In some instances, for example when a similarity metric sets the two predicates equal to each other, there may not be predicate parameters for the predicates, as they must equal each other. In some embodiments, however, the similarity metrics may simply compare various predicates, and therefore a predicate parameter (or parameters) may be used to indicate how similar the predicates must be. For example, again using the "jaccardSimilarity (r1.location, r2.location, $\tau_1$)" similarity metric, determining that Ti is 70 is determining the predicate parameter for this similarity metric (with the predicate parameter being 70 in this instance).

The deep neural network 330 may form conditions (to be used in the entity resolution model) based on the conjunctions and the predicate parameters. For example, "jaccardSimilarity (r1.location, r2.location, 70)" may be a determined condition. In some instances, the condition may include "jaccardSimilarity (r1.location, r2.location, 70) and . . . " (with "and" being the conjunction), as the one condition may not be enough on its own to establish whether entities are matching, and other conditions may also need to be met.

In entity resolution model environment 300, the deep neural network outputs conditions 352, 354, and 356. In some instances, conditions 352, 354, and 356 correspond to the similarity metrics determined using the recurrent neural network 330. For instance, the conditions 352, 354, an 356 may be similarity metrics with the predicate parameters and conjunctions established (for instance, as opposed to simply being variables). In some embodiments, conditions 352, 354, and 356 make up a rule for an entity resolution model.

In some embodiments, other pairs of entities (for example other historical pairs of entities) are inputted into the embedding layer 320, recurrent neural network 330, and deep neural network 340. This may introduce other conditions (in addition to conditions 352, 354, and 356), and/or may strengthen the current conditions 352, 354, and 356. For example, other historical pairs of entities may have established a condition "jaccardSimilarity (r1.location, r2.location, 80)." This condition may be merged with the previous condition "jaccardSimilarity (r1.location, r2.location, 70)" to form a strengthened condition of "jaccardSimilarity (r1.location, r2.location, 75)." In this example, the updated predicate parameter for the condition may be a parameter that reduces findings of locations that are similar enough to meet the threshold but not actually matching locations (which may occur with the predicate parameter of 70), while also preventing instances of locations not meeting the threshold but actually being matching locations (which may occur with the predicate parameter of 80).

In some embodiments, conditions 352, 354, and 356 (and, in some instances, other conditions not depicted in FIG. 3) make up entity resolution model 350. These conditions may make up various rules and the rules may make up the entity resolution model 350 (for example, as depicted in FIG. 5).

In some embodiments, as depicted in FIG. 3, once the entity resolution model 350 is formed, a new pair of entities 358 is inputted into the entity resolution model 350. In some instances, the new pair of entities 358 are from operation 140 of FIG. 1. In some embodiments, entity resolution model 350 may apply the conditions 352, 354, and 356 to the new pair of entities to determine whether any of the conditions 352, 354, and 356 and any of the rules for the entity resolution model 350 are satisfied for the new pair of entities. In some instances, it may be difficult to determine which rules and/or conditions 352, 354, and 356, to apply to the new pair of entities. For example, it may be difficult to distinguish between a last name and a business name for an entity. In these entities, the entity resolution model 350 may use the information known for the entity and may categorize the entity (for example, as an individual, a product, a business, etc.). Then the entity resolution model 350 may apply rules that correspond to the category. For example, an entity may be an email account for an email "smithbusiness@smithbusiness.com." In this example, the word "business" in the email account may result in the entity being categorized as a business entity, and the rules relating to businesses may be applied. In some instances, the findings of the application of the conditions 352, 354, and 356 to the new pair of entities 358 (for example, the determination of which, if any, of the conditions 352, 354, and 356) may be inputted into a neural network 360 to determine the predicted score 370 (i.e., a score of how similar, or how matching, the entities are) for the new pair of entities 358. The predicted score 370 and the determination of whether a pair of entities (such as the new pair of entities 358) is further discussed herein and depicted in FIG. 6.

Figure 4:
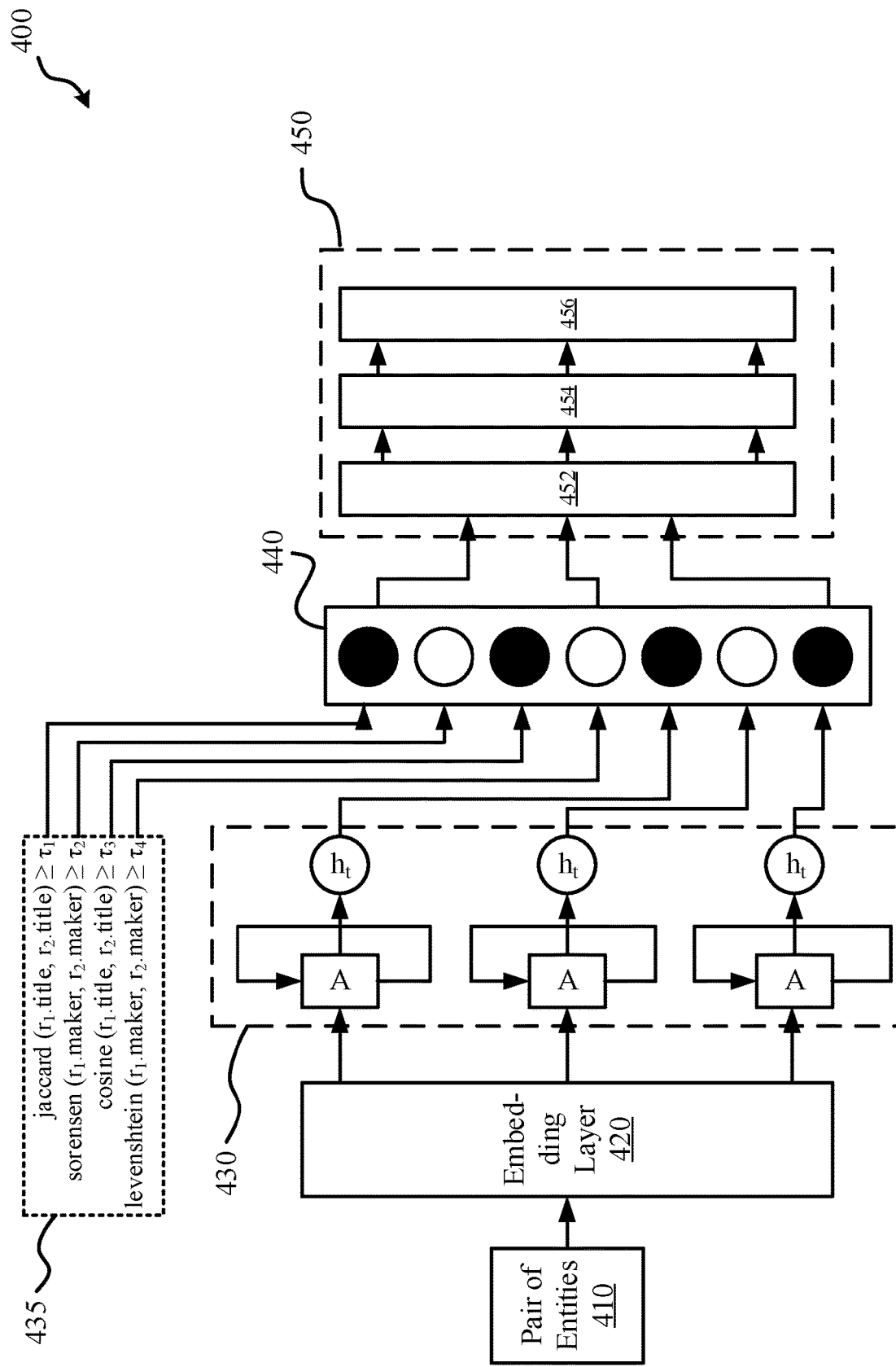
FIG. 4 depicts a schematic diagram of a second example entity resolution model environment, according to some embodiments.

Referring to FIG. 4, a schematic diagram of an example entity resolution model environment 400 is depicted, according to some embodiments. Entity resolution model 400 includes a pair of entities 410 and an embedding layer 420. In some instances, the pair of entities 410 are received and inputted into the embedding layer 420 as discussed herein in relation to FIG. 3 (and the pair of entities 310 and embedding layer 320 depicted in FIG. 3). However, in entity resolution model 400, the similarity metrics include predefined similarity metrics 435. In some embodiments (not depicted), entity resolution model environment may proceed from the embedding layer 420 to the predefined similarity metrics 435. In some instances, the predefined similarity metrics 435 are determined based on the pair of entities 410 (for example, a historical pair of entities). For instance, there may be a selection of predefined similarity metrics (for example, determined using conventional entity resolution methods), and predefined similarity metrics 435 may be the similarity metrics from the selection of predefined similarity metrics that can be applied to the pair of entities 410. For example, the pair of entities 410 may include a name and an address for an individual, so the predefined similarity metrics 435 may be similarity metrics relating to names and addresses.

In another example, a historical pair of entities includes an entity "Joe John Doe, 0000 $10^{th}$ Avenue SW, Rochester, MN" and an entity "Joe Doe, 0000 10 Ave., Rochester, Minnesota" From the historical pair of entities, it may be determined that factors such as first name, last name, middle name, house number, street name, direction, city, and state may all be factors that would help determine whether the two entities are matching. Using these factors, there may be predefined similarity metrics that any of the corresponding factors being equal may help determine whether the pair of entities are matching, such as "r1.streetname= r2.streetname." Further, in this example, it may be determined that the factors may not need to be fully equal in order to be matching entities. For instance, "$10^{th}$ Avenue SW' and "10 Ave." are not identical street names, however they may still be referring to the same street. Therefore, there may be another predefined similarity metric, in this example, "jaccard (r1.streetname, r2streetname)$\geq \tau_1$" that shows that street names that are above a similarity threshold can also help determine whether entities are matching.

In entity resolution model environment 400, the predefined similarity metrics 435 include a metric "jaccard (r1.title, r2.title)$\geq \tau_1$" that indicates that the Jaccard index (a coefficient of similarity) between the title of a first entity and the title of a second entity must be greater than or equal to a threshold coefficient (in order to be considered matching). The predefined similarity metrics 435 also include a metric "sorensen (r1.maker, r2.maker)$\geq \tau_2$." indicating that the Sorensen dissimilarity coefficient (another coefficient of similarity) for the makers (e.g., manufacturers) of a product must be greater than or equal to a threshold coefficient (in order to be considered matching). The predefined similarity metrics 435 also include a metric "cosine (r1.title, r2.title)$\geq \tau_3$" indicating that Salton's cosine index (another similarity metric/coefficient) for the titles of the first entity and the second entity (of the pair of entities 410) must be greater than or equal to a threshold coefficient (in order to be considered matching). The predefined similarity metrics 435 also include a metric "levenshtein (r1.maker, r2.maker)$\geq \tau_4$" indicating that the Levenshtein distance (the distance between words, or the number of character edits required to change one word to the other) between the maker of the first entity and the maker of the second entity must be greater than or equal to a threshold coefficient. In some instances, the predefined similarity metrics 435 are enough, on their own, to form enough conditions (e.g., 452, 454, and 456) and form an entity resolution model 450 that is satisfactory at performing entity resolution on pairs of entities.

However, in some instances, the predefined similarity metrics 435 are not sufficient, on their own, to form a satisfactory entity resolution model 450. For instance, in entity resolution model environment 400, the predefined similarity metrics 435 are all similarity metrics that look at coefficients of how similar the titles and makers of the pair of entities 410 are. However, only looking at the titles and makers of entities may not be enough to form a sufficient entity resolution model 450. For example, when a product keeps the same name but changes a version or model number, the product may have the same title and maker but may not be the same, or matching with, an earlier version of the product.

In some instances, as depicted in FIG. 4, when it is determined that the predefined similarity metrics 435 are not fully sufficient for the entity resolution model 450 and/or the pair of entities 410, additional similarity metrics are also learned using a neural network such as a recurrent neural network 430. Recurrent neural network 430 and learning similarity metrics using recurrent neural network 430 may correspond to recurrent neural network 330 (FIG. 3) discussed herein. In entity resolution model environment 400, both the learned similarity metrics and the predefined similarity metrics 435 are inputted into the deep neural network 440 and are used to form conditions 452, 454, and 456. In some instances, each similarity metric may correspond to a different condition (e.g., conditions 452, 454, and 456). In some instances, similarity metrics may be combined to form a single condition (e.g., conditions 452, 454, and 456).

Referring to FIG. 5, an example entity resolution model 500 is depicted, according to some embodiments. In some embodiments, entity resolution model 500 may correspond to entity resolution model 350 (FIG. 3) or entity resolution model 450 (FIG. 4). Entity resolution model 500 includes a plurality of rules and a plurality of conditions within each rule. For instance, rule 1 includes the conditions "r1.lastname=r2.lastname," "r1.exactfn=r2.exactfn," "middleNameOptionalMatch (r1.middlename, r2middlename)," "jaccardSimilarity (r1.location, r2.location, 70)," and "allFullFirstName (r1.isfnlnit, r2.isfnlnit)." Additionally, each condition is connected by the conjunction "and," therefore all the conditions must be met in order for rule 1 to be satisfied. In some embodiments, forming the conditions for rule 1 (for example, using deep neural network 340 (FIG. 3) or deep neural network 440 (FIG. 4)) may have included determining that the conjunctions between conditions should all be "and" and determining that the predicate parameter for the condition "jaccardSimilarity (r1.location, r2.location, 70)" should be 70.

In some instances (not depicted), rule 1 and rule 2 of the entity resolution model 500 may have been formed by grouping conditions that correspond to each other or relate to each other, and then establishing the rule using the grouped conditions. For instance, the conditions for rule 1 may have been determined to be related to individuals, or people, and the conditions for rule 2 may have been determined to be related to businesses, or organizations. Therefore, in some instances, rule 1 of the entity resolution model 500 may apply when the entities undergoing entity resolution are individuals, and rule 2 of the entity resolution model 500 may apply when the entities undergoing entity resolution are businesses/organizations. In some embodiments, this may be determined by the system performing the entity resolution. The entity resolution model 500 may be a part of the system and/or the system may have access to the entity resolution model 500. In some embodiments, only one of the rules needs to be satisfied in order for two entities to be deemed matching.

Figure 6:
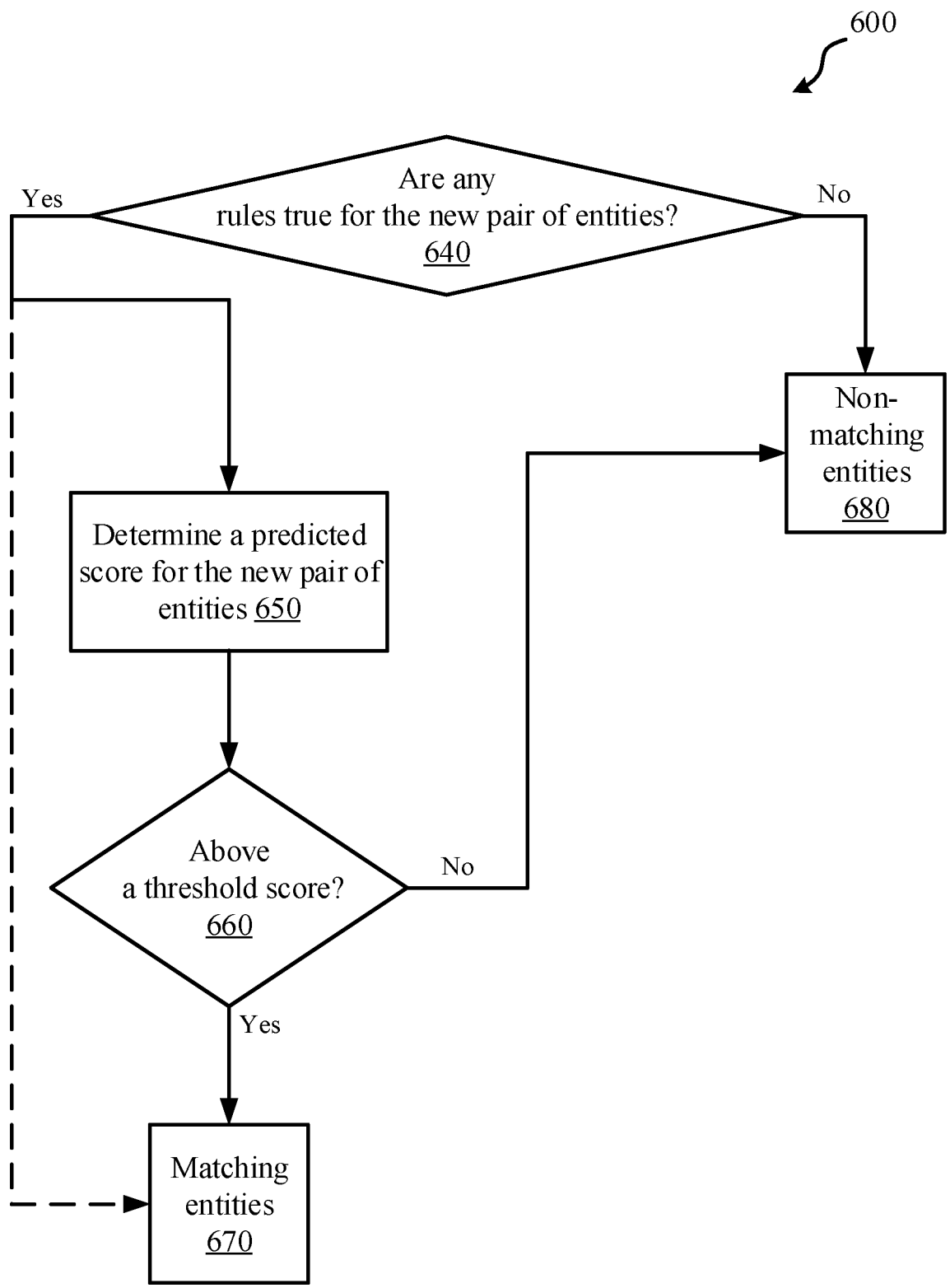
FIG. 6 depicts a flowchart of a set of operations for using an entity resolution model to determine whether a pair of entities are matching entities, according to some embodiments.

Referring to FIG. 6, a method 600 for using an entity resolution model to determine whether a pair of entities are matching entities is depicted, according to some embodiments. In some embodiments, method 600 corresponds to operation 150 of FIG. 1.

As discussed herein, entity resolution includes determining whether entities are considered matching and can be grouped together as a single entity. To determine whether the entities are matching, an entity resolution model (such as entity resolution model 220 (FIG. 2), entity resolution model 350 (FIG. 3), entity resolution model 450 (FIG. 4), and/or entity resolution 500 (FIG. 5)) may be used. Specifically, it may be determined whether rules from the model are satisfied.

Therefore, method 600 includes operation 640 to determine whether any rules from the entity resolution model are true for the new pair of entities. As discussed herein, an entity resolution model may include one or more rules (and in some instances, multiple conditions within each rule) that indicate when two entities can be considered matching. As depicted in FIG. 5, in some instances different rules can correspond to different types of entities. Therefore, typically only one rule needs to be satisfied (or considered true) in order for two entities to be considered matching. However, as depicted in FIG. 5, a single rule can include multiple conditions, and sometimes every condition within the rule must be satisfied in order for a rule to be considered true.

In some embodiments, determining whether any rules are true for the new pair of entities (i.e., operation 640) includes inputting the new pair of entities into the entity resolution model. For example, as depicted in FIG. 3, a new pair of entities 358 is inputted into an entity resolution model 350. In some embodiments, the entity resolution model may have undergone sparsification to reduce the amount of rules within the model, and the new pair of entities may be inputted into a sparsified entity resolution model. Once the new pair of entities are inputted into the entity resolution model, it may be determined whether any of the rules are true for the new pair of entities. If there are no rules that are true for the new pair of entities, method 600 proceeds to operation 680 and it is determined that the pair of entities are non-matching entities and should be treated as separate entities. In some instances, operation 680 includes labelling the new pair of entities as non-matching entities.

In some embodiments, if it is determined that there are one or more rules that are true for the new pair of entities (in operation 640), method 600 may proceed directly to operation 670 and it is determined that the pair of entities are matching entities. In some instances, operation 670 includes labelling the new pair of entities as matching entities.

In some embodiments, if it is determined that there are one or more rules that are true for the new pair of entities (in operation 640), method 600 proceeds to operation 650 to determine a predicted score for the new pair of entities. The predicted score may be a predicted amount of similarity between the new pair of entities. In some instances, to further increase the accuracy of the entity resolution on the new pair of entities, the entities may be checked to determine that they are above a threshold similarity. This may check for instances where entities satisfy one or more rules but are not actually matching entities. As depicted in FIG. 3, the results of applying the entity resolution model to the new pair of entities (for example, including whether any of the rules are true for the new pair of entities (as determined in operation 640)) may be inputted into a neural network (e.g., neural network 360 (FIG. 3)) to determine a predicted score for the pair of entities. In some instances, the neural network was built and trained using historical entity resolution data.

Method 600 includes operation 660 to determine whether the predicted score is above a threshold score. In some embodiments, the threshold score is a predefined value set by a user. If the predicted score is not above the threshold score, the method 600 may proceed to operation 680 and the pair of entities are determined to be non-matching entities. If the predicted score is above the threshold score, the method 600 proceeds to operation 670 and the pair of entities are determined to be matching entities.

Figure 7:
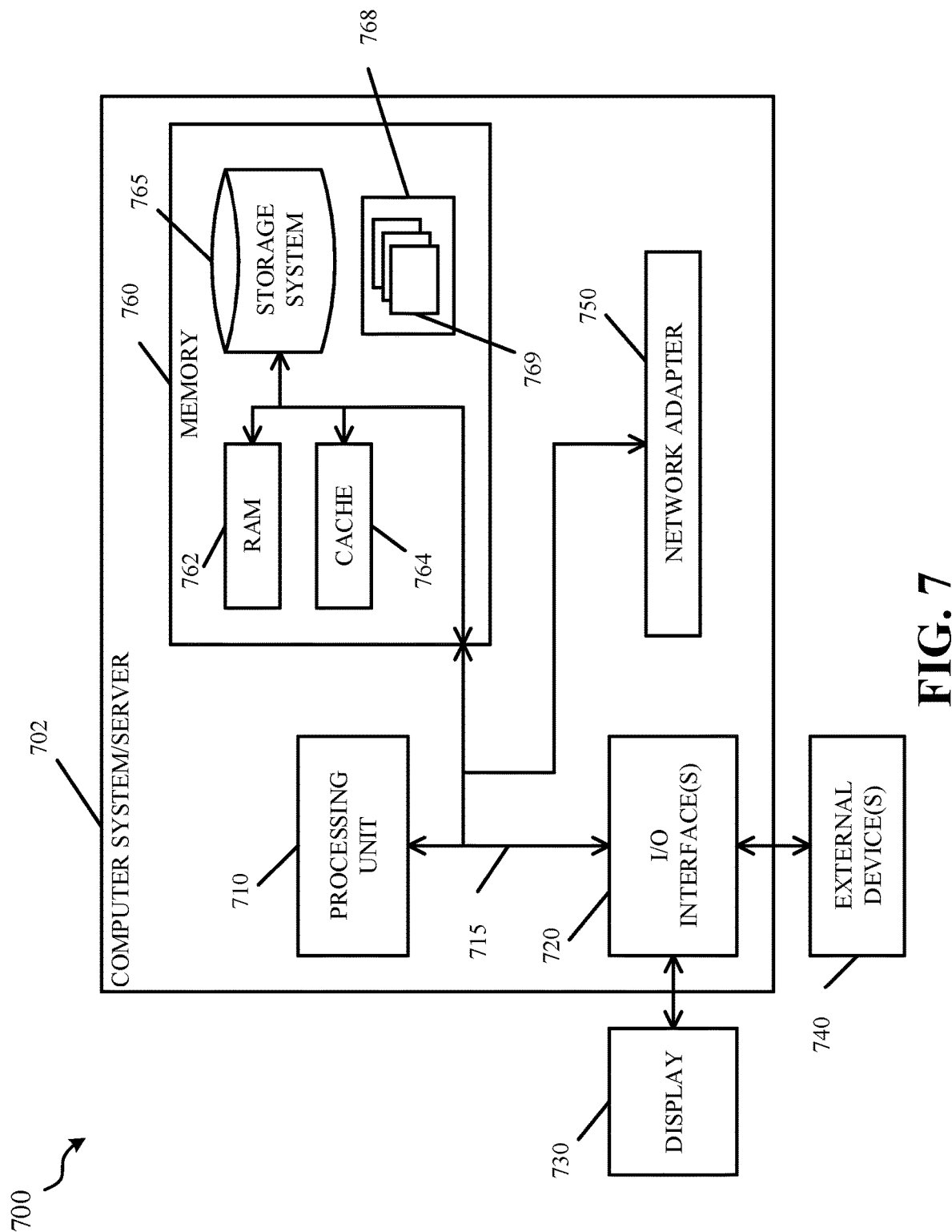
FIG. 7 depicts a block diagram of an example computer system environment, according to some embodiments.

Referring to FIG. 7, computer system 700 is a computer system/server 702 is shown in the form of a general-purpose computing device, according to some embodiments. In some embodiments, computer system/server 702 is located on the linking device. In some embodiments, computer system 702 is connected to the linking device. The components of computer system/server 702 may include, but are not limited to, one or more processors or processing units 710, a system memory 760, and a bus 715 that couples various system components including system memory 760 to processor 710.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 760 can include computer system readable media in the form of volatile memory, such as random-access memory (RAM) 762 and/or cache memory 764. Computer system/server 702 may further include other removable/non-removable, volatile/non-volatile computer system storage media. By way of example only, storage system 765 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 760 may include at least one program product having a set (e.g., at least one) of program modules that are configured to carry out the functions of embodiments of the disclosure.

Program/utility 768, having a set (at least one) of program modules 769, may be stored in memory 760 by way of example, and not limitation, as well as an operating system, one or more application programs, other program modules, and program data. Each of the operating system, one or more application programs, other program modules, and program data or some combination thereof, may include an implementation of a networking environment. Program modules 769 generally carry out the functions and/or methodologies of embodiments of the invention as described herein.

Computer system/server 702 may also communicate with one or more external devices 740 such as a keyboard, a pointing device, a display 730, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 720. Still yet, computer system/server 702 can communicate with one or more networks such as a local area network (LAN), a general wide area network (WAN), and/or a public network (e.g., the Internet) via network adapter 750. As depicted, network adapter 750 communicates with the other components of computer system/server 702 via bus 715. It should be understood that although not shown, other hardware and/or software components could be used in conjunction with computer system/server 702. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving historical pairs of entities including labels indicating whether the historical pairs of entities match;
determining a set of rules for determining whether a pair of entities are matching using the historical pairs of entities, wherein the set of rules comprises a plurality of conditions, each condition representing an instance where the pair of entities could be matching;
building and training a deep neural network using the historical pairs of entities, wherein similarity functions of the historical pairs of entities are input into an embedding layer of the deep neural network, and the deep neural network learns at least predicate parameters and types of conjunctions for the similarity functions and forms entity resolution rules based on the similarity functions and corresponding predicate parameters and types of conjunctions;
developing, using the deep neural network, an entity resolution model based on the historical pairs of entities and the entity resolution rules, wherein the deep neural network comprise a recurrent neural network, and wherein the recurrent neural network is used to determine similarity metrics for the historical pairs of entities in the entity resolution model and analyze the historical pairs of entities and learn similarity metrics from the analysis;
responsive to entity resolution model being developed, receiving, by the entity resolution model, a new pair of entities; and
applying the entity resolution model to the new pair of entities, wherein applying the entity resolution model comprises:
determining whether the one or more conditions and the entity resolution rules associated with the entity resolution model are satisfied by the new pair of entities; and
categorizing the new pair of entities as matching or not matching, based on whether the one or more rules are satisfied.

2. The method of claim 1, wherein determining the set of rules comprises:
determining similarity metrics of the historical pairs of entities, wherein the similarity metrics are metrics for determining whether a pair of entities are similar;

determining one or more conditions for each similarity metric of the similarity metrics, wherein the one or more conditions indicate when a similarity metric is a matching metric; and forming the one or more rules within the set of rules for when entities are matching, the one or more rules formed from the one or more conditions.

3. The method of claim 2, wherein determining similarity metrics for the historical pairs of entities comprises:

identifying predefined similarity metrics based on the historical pairs of entities, wherein the predefined similarity metrics comprise a conjunction of predicates, the conjunction of predicates including a collection of similarity clauses.

4. The method of claim 3, wherein determining the similarity metrics for the historical pairs of entities further comprises:

determining whether the predefined similarity metrics are sufficient to form a satisfactory entity resolution model; and in response to determining that the predefined similarity metrics are not sufficient, learning similarity metrics for the historical pair of entities using a neural network, resulting in learned similarity metrics.

5. The method of claim 2, wherein determining the one or more conditions comprises:

inputting the similarity metrics into the deep neural network;

learning, from the deep neural network, conjunctions and predicate parameters for each similarity metric; and forming the one or more conditions for each similarity metric based on the conjunctions and the predicate parameters.

6. The method of claim 2, wherein forming the one or more rules comprises:

grouping corresponding conditions from the one or more conditions, resulting in condition groups; and creating a rule for each condition group and each condition not in a condition group.

7. The method of claim 1, wherein the detecting comprises:

determining a significance weight for each rule from the set of rules, wherein the significance weight indicates how significant each rule is in determining whether a pair of entities is matching.

8. The method of claim 1, further comprising:

determining a predicted score for the new pair of entities, wherein the predicted score is a predicted amount of similarity between the new pair of entities; and determining whether the predicted score for the new pair of entities is above a threshold predicted score.

9. The method of claim 1, wherein the set of rules comprises directly interpretable logical rules.

10. A system having one or more computer processors, the system configured to:

receive historical pairs of entities including labels indicating whether the historical pairs of entities match;

determine a set of rules for determining whether a pair of entities are matching using the historical pairs of entities, wherein the set of rules comprises a plurality of conditions, each condition representing an instance where the pair of entities could be matching;

build and train a deep neural network using the historical pairs of entities, wherein similarity functions of the historical pairs of entities are input into an embedding layer of the deep neural network, and the deep neural network learns at least predicate parameters and types of conjunctions for the similarity functions and forms entity resolution rules based on the similarity functions and corresponding predicate parameters and types of conjunctions develop, using the deep neural network, an entity resolution model based on the historical pairs of entities and the entity resolution rules, wherein the deep neural network comprise a recurrent neural network, and wherein the recurrent neural network is used to determine similarity metrics for the historical pairs of entities in the entity resolution model and analyze the historical pairs of entities and learn similarity metrics from the analysis;

responsive to entity resolution model being developed, receive, by the entity resolution model, a new pair of entities; and apply the entity resolution model to the new pair of entities, wherein applying the entity resolution model comprises:

determining whether one or more rules from the set of rules are satisfied for the new pair of entities; and categorizing the new pair of entities as matching or not matching, based on whether the one or more rules are satisfied.

11. The system of claim 10, wherein determining the set of rules comprises:

determining similarity metrics of the historical pairs of entities, wherein the similarity metrics are metrics for determining whether a pair of entities are similar;

determining one or more conditions for each similarity metric of the similarity metrics, wherein the one or more conditions indicate when a similarity metric is a matching metric; and forming the one or more rules within the set of rules for when entities are matching, the one or more rules formed from the one or more conditions.

12. The system of claim 11, wherein determining similarity metrics for the historical pairs of entities comprises:

identifying predefined similarity metrics based on the historical pairs of entities, wherein the predefined similarity metrics comprise a conjunction of predicates, the conjunction of predicates including a collection of similarity clauses.

13. The system of claim 11, wherein determining the one or more conditions comprises:

inputting the similarity metrics into the deep neural network;

learning, from the deep neural network, conjunctions and predicate parameters for each similarity metric;

determining one or more parameters for each similarity metric; and forming the one or more conditions for each similarity metric based on the one or more parameters, the conjunctions, and the predicate parameters.

14. The system of claim 11, wherein forming the one or more rules comprises:

grouping corresponding conditions from the one or more conditions, resulting in condition groups; and creating a rule for each condition group and each condition not in a condition group.

15. A computer program product comprising a computer readable storage medium having program instructions embodied therewith, the program instructions executable by a server to cause the server to perform a method, the method comprising:

receiving historical pairs of entities including labels indicating whether the historical pairs of entities match;

determining a set of rules for determining whether a pair of entities are matching using the historical pairs of entities, wherein the set of rules comprises a plurality of conditions, each condition representing an instance where the pair of entities could be matching, and wherein one condition of the plurality of conditions identifies a property that must be equal between the pair of entities in order for those entities to be matching;

building and training a deep neural network using the historical pairs of entities, wherein similarity functions of the historical pairs of entities are input into an embedding layer of the deep neural network, and the deep neural network learns at least predicate parameters and types of conjunctions for the similarity functions and forms entity resolution rules based on the similarity functions and corresponding predicate parameters and types of conjunctions;

developing, using the deep neural network, an entity resolution model based on the historical pairs of entities and the entity resolution rules, wherein the deep neural network comprise a recurrent neural network, and wherein the recurrent neural network is used to determine similarity metrics for the historical pairs of entities in the entity resolution model and analyze the historical pairs of entities and learn similarity metrics from the analysis;

responsive to entity resolution model being developed, receiving, by the entity resolution model, a new pair of entities; and applying the entity resolution model to the new pair of entities, wherein applying the entity resolution model comprises:

determining whether the one or more conditions and the entity resolution rules associated with the entity resolution model are satisfied by the new pair of entities;

categorizing the new pair of entities as matching or not matching, based on whether the one or more rules are satisfied;

detecting that a rule in the set of rules was not significant during the categorizing; and removing, in part in response to the detecting, the rule from the entity resolution model, resulting in a sparsified entity resolution model.

16. The computer program product of claim 15, wherein the detecting comprises:

determining a significance weight for each rule from the set of rules, wherein the significance weight indicates how significant each rule is in determining whether a pair of entities is matching.

17. The computer program product of claim 15, wherein determining the set of rules comprises:

determining similarity metrics of the historical pairs of entities, wherein the similarity metrics are metrics for determining whether a pair of entities are similar;

determining one or more conditions for each similarity metric of the similarity metrics, wherein the one or more conditions indicate when a similarity metric is a matching metric; and forming the one or more rules within the set of rules for when entities are matching, the one or more rules formed from the one or more conditions.

18. The computer program product of claim 17, wherein determining the one or more conditions comprises:

inputting the similarity metrics into the deep neural network;

learning, from the deep neural network, conjunctions and predicate parameters for each similarity metric;

determining one or more parameters for each similarity metric; and forming the one or more conditions for each similarity metric based on the one or more parameters, the conjunctions, and the predicate parameters.

* * * * *